United States Patent Office 3,534,304
Patented Oct. 13, 1970

3,534,304
ELECTRICAL SWITCHGEAR WITH ACTUATING MEANS INCORPORATING AN OVERCURRENT TRIP
Alfred Alexander Robinson and Edward Raymond Burdett, Stafford, England, assignors to The English Electric Company Limited, London, England, a British company
Filed Nov. 4, 1968, Ser. No. 773,090
Claims priority, application Great Britain, Nov. 13, 1967, 51,601/67
Int. Cl. H01h 77/10
U.S. Cl. 335—16                                     10 Claims

ABSTRACT OF THE DISCLOSURE

An automatic fault current trip mechanism for a vacuum switch (10) comprises a fixed coil (36) in series with the movable contact (12), and a conductive plate (40) which is carried by the actuating rod (17) of a magnetic latch actuator (15) so as to lie adjacent to and be mutually inductively coupled with the fixed coil (36) when the contacts (11) and (12) are closed. During normal operation the magnetic force holding the magnetic latch actuator (15) closed exceeds the electromagnetic force tending to repel the plate (40) from the fixed coil (36), whereas the electromagnetic force exceeds the magnetic force and breaks the magnetic latch to open the contacts (11) and (12) when a fault current occurs.

---

This invention relates to electrical switchgear and more particularly to actuating means therefor.

It is desirable to interrupt an electric circuit as soon as possible after a fault has occurred in the circuit so that fault currents (e.g. short circuit currents) may be cleared quickly. Known methods of detecting the existence of fault currents and thereafter operating the actuating means of a vacuum circuit interrupter to open the contacts of the vacuum circuit interrupter result in a time lag of up to two fault current cycles between the initiation and final clearance of the fault current, even though the vacuum circuit interrupter may be capable of interrupting the fault current at the first current zero occurring after contact opening.

Provision in series with the vacuum circuit interrupter of a fuse having a rating chosen so that it will interrupt fault currents can enable a fault current to be interrupted at the occurrence of the first current zero after its initiation. However, utilisation of such a fuse has the disadvantage that it must be replaced after it has interrupted a fault current, before reclosure of the circuit can take place.

This invention includes within its scope a vacuum circuit interrupter having actuating means associated therewith whereby the contacts may be opened before the occurrence of the first current zero after the initiation of a fault current.

According to this invention, electrical switchgear includes a movable contact, actuating means having a movable part coupled to the movable contact for moving the latter into or out of engagement with a co-operating contact, and first and second relatively movable elements which are mutually inductively coupled when the contacts are closed, the first element being mounted on said movable part and the second element being mounted on fixed structure of the switchgear, at least one of said elements comprising coil means electrically connected in series with one of the contacts, the arrangement being such that, during normal operation of the switchgear with the contacts closed, the actuaing means urges the movable contact to its engaged position against the electro-magnetic force normally exerted between the two elements, whereas, if the current flowing through the coil means exceeds a predetermined value, the electro-magnetic force overcomes the force applied by the actuating means whereby to move said movable part in the contact opening direction.

Preferably said second element comprises a said coil means which is rigidly mounted on said fixed structure and said first element is positioned in close proximity to said rigidly mounted coil means when the contacts are closed so that the electro-magnetic force urges said first element away from said rigidly mounted coil means.

The other element may comprise a conductive plate or further coil means.

Preferably the contacts are the contacts of a vacuum circuit interrupter and the actuating means includes a magnetic actuator.

One embodiment of this invention applied to a vacuum circuit interrupter will now be described by way of example with reference to the accompanying drawings, of which:

Figure 1:
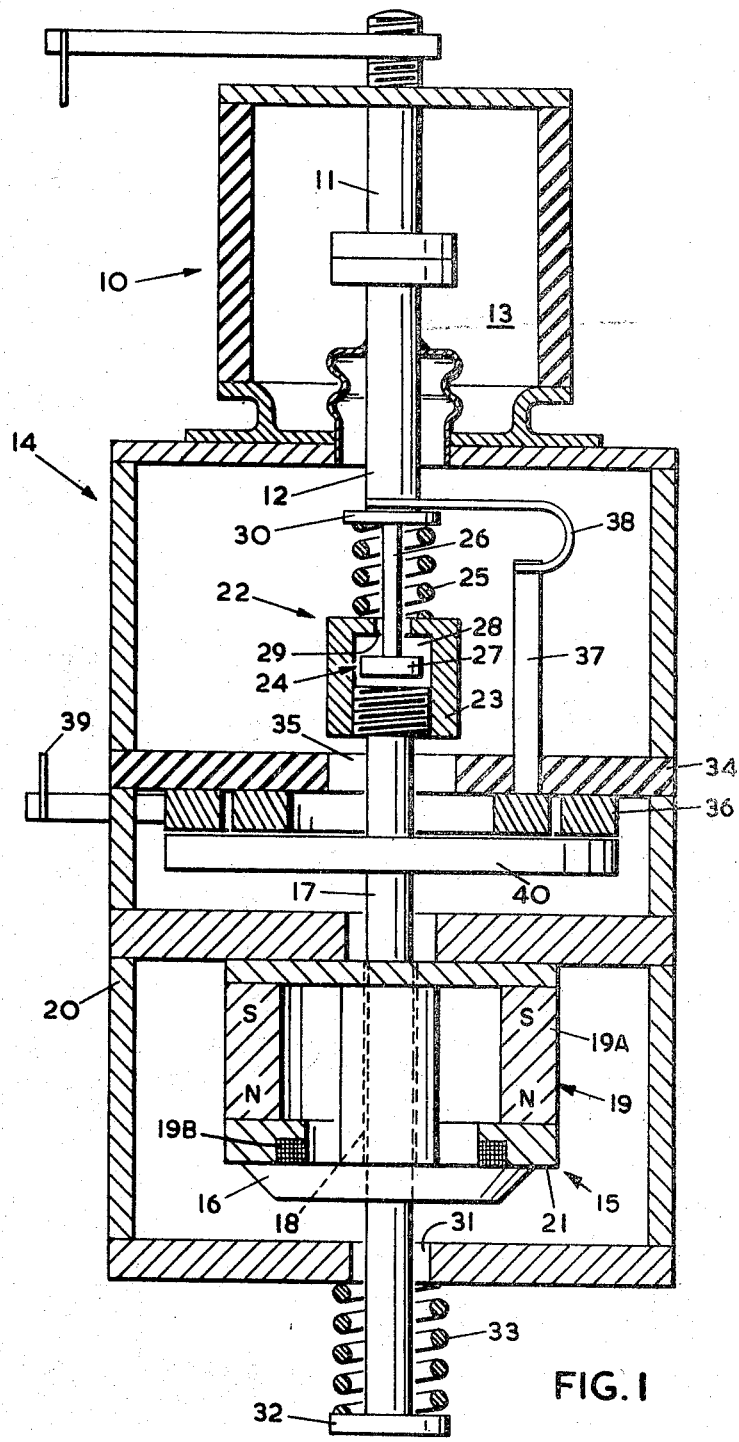
FIG. 1 shows the vacuum circuit interrupter having actuating means associated therewith in accordance with this invention.

Referring to FIG. 1, the vacuum circuit interrupter generally indicated at 10 is vertically orientated and comprises a fixed contact 11, which co-operates with a movable contact 12; the contacts 11, 12 are housed in a chamber 13 which is evacuated. The contacts 11, 12 and the chamber 13 may be of any desired construction in accordance with vacuum circuit interrupter practice, and are therefore not described in detail.

An actuating device 14 is provided for opening and closing the contacts 11, 12. The actuating device 14 includes a magnetic actuator 15 having an armature plate 16 mounted on an actuating rod 17 which is free to move axially within a bore 18 passing through a fixed body part 19. The fixed body part 19 is mounted on the casing 20 of the actuating device 14 and carries a permanent magnet 19A and a flux diverting coil 19B. The armature plate 16 is adapted to bear against the lower face 21 of the fixed body part 19 and may be held in contact with the lower face 21 by the magnetic force exerted by the permanent magnet. The actuating rod 17 is coupled to the movable contact 12 through a connecting device 22 which enables pressure to be applied to the contacts 11, 12 when they are engaged. The connecting device 22 comprises a housing 23 screwed onto the upper end of the actuating rod 17, an element 24 carried by the movable contact 12 and a compression spring 25. The element 24 comprises a rod portion 26 carrying a disc portion 27 at its lower end. The disc portion 27 lies within the chamber 28 of the housing 23. The chamber 28 has an opening 29 at the top, the lateral dimensions of the opening 29 being greater than the width of the rod portion 26 but less than the width of the disc portion 27. The depth of the chamber 28 allows relative vertical movement between the element 24 and the housing 23 to occur. The spring 25 surrounds the rod portion 26 and bears between the upper face of the housing 23 and a flange 30 formed at the top of the element 24.

The actuating rod 17 extends below the armature plate 16, passes through an aperture 31 provided in the lower end wall of the casing 20, and terminates in a flange 32. A compression spring 33 surrounds the portion of the actuating rod 17 outside the casing 20 and bears between the flange 32 and the outside of the lower end wall of the casing 20.

A mounting plate 34 of electrically insulating material is mounted horizontally within the casing 20 above the magnetic actuator 15. The mounting plate 34 is provided with a central aperture 35 through which the actuating rod 17 passes. A pancake coil 36 is rigidly mounted on the underside of the mounting plate 34 so as to surround and be spaced from the actuating rod 17. The innermost end of the coil 36 is connected to the movable contact 12 through a conductor 37 which extends through the mounting plate 34, and a flexible lead 38. The other end of the coil 36 is connected to a terminal 39 which is located externally of the casing 20 and which conveniently affords a terminal of the circuit interrupter 10. A highly conductive plate 40 (e.g., of aluminium alloy) is rigidly mounted on the actuating rod 17 so as to extend laterally of the actuating rod 17 below the coil 36. The conductive plate 40 is positioned in such a way that it lies in close proximity to the coil 36 and is thus mutually inductively coupled with the coil 36 when the contacts 11, 12 of the vacuum circuit interrupter 10 are held closed by the magnetic actuator 15.

Figure 2:
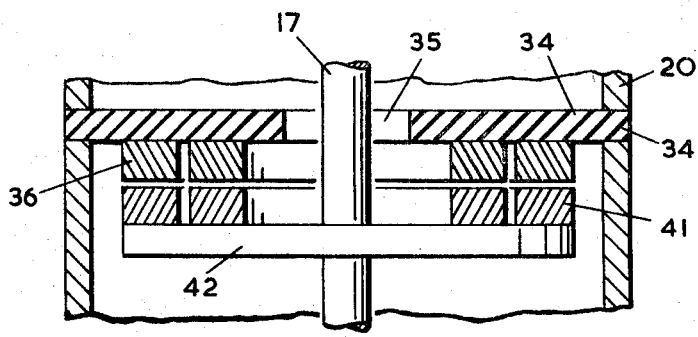
FIG. 2 is a fragmentary sectional view illustrating a modification of the embodiment of FIG. 1.

Referring to FIG. 2, there is shown a modification of the actuating device 14 of FIG. 1 wherein the highly conductive plate 40 is replaced by a second pancake coil 41 which is mounted in a similar position to the conductive plate 40 on the upper side of an electrically insulating mounting plate 42 rigidly secured to the actuating rod 17. It is to be understood that, when the contacts 11, 12 are held closed by the magnetic actuator 15, the coils 36 and 41 are mutually inductively coupled. Furthermore, the coils 36 and 41 are arranged so that the electro-magnetic force induced by current flowing through the coil 36 tends to force the coil 41 away from it. This may be achieved by connecting the coil 36 between the movable contact 12 and the terminal 39 as in FIG. 1, in which case the ends of the coil 41 would be connected together. Alternatively this may be achieved by suitably connecting one end of the coil 36 to the movable contact 12, by connecting the other end of the coil 36 to the appropriate end of the coil 41 through a flexible connection, and by connecting the other end of the coil 41 to the terminal 39 through a suitable flexible connection.

Figure 3:
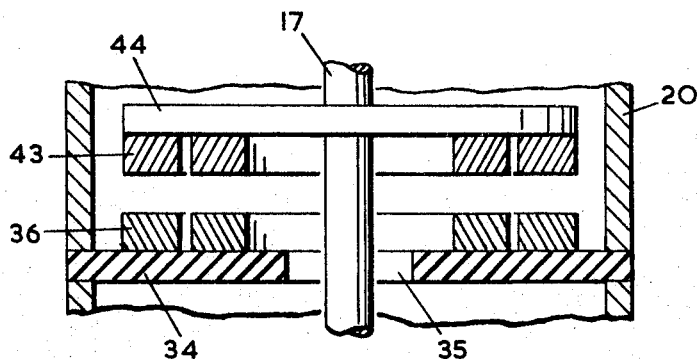
FIG. 3 is a fragmentary sectional view illustrating a further modification of the embodiment of FIG. 3.

The modification described with reference to FIG. 2 may be further modified as shown in FIG. 3. The pancake coil 36 is mounted on the upper side of the mounting plate 34 instead of being on the underside thereof. In this modification a pancake coil 43 is mounted on the underside of a mounting plate 44 of electrically insulating material which is rigidly secured to the actuating rod 17 above the coil 36. The two coils 36 and 43 are spaced apart, when the contacts 11, 12 are engaged, by a distance which is at least as great as the spacing between the contacts 11, 12 in their open position and are mutually inductively coupled. It is to be understood that the coils 36 and 43 are arranged so that the electro-magnetic force induced by current flowing through the coil 36 tends to attract the coils 43 towards it. This is achieved by suitably connecting one end of the coil 36 to the movable contact 12, by connecting the other end of the coil 36 to the appropriate end of the coil 43 through a flexible connection, and by connecting the other end of the coil 43 to the terminal 39 through a suitable flexible connection.

The method of operation of the embodiment of this invention illustrated in FIG. 1 and of the modification thereof illustrated in FIG. 2 is as follows:

Initially, the contacts 11, 12 are open, the armature plate 16, the conductive plate 40 (FIG. 1), or the coil 41 (FIG. 2) and the housing 23 are in their lowermost positions due to the action of the spring 33 and gravity. It will be understood that the element 24 is in the uppermost position relative to the housing 23 with the upper face of the disc portion 27 bearing against the upper wall of the chamber 28 due to the action of the compression spring 25.

When it is desired to close the contacts 11, 12 of the vacuum circuit interrupter 10, the flux diverting coil is energised in the direction whereby the magnetic flux it produces augments the magnetic flux produced by the permanent magnet so that the armature plate 16 is attracted towards the main body part 19. The contacts 11, 12 engage before the armature plate 16 engages with the lower face 21. Once the contacts 11, 12 have been engaged the armature plate 16 and the actuating rod 17 continue to rise, thus compressing the spring 25 and increasing the pressure applied between the contacts 11, 12. It will be appreciated that whilst the spring 25 is being compressed the housing 23 moves relative to the element 24. The actuating rod 17 and the housing 23 continue to rise until the armature plate 16 engages the lower face 21, in which position the conductive plate 40 (FIG. 1), or the coil 41 (FIG. 2), lies in the desired close proximity to the coil 36.

If it is desired to open the contacts 11, 12 during normal operation of the interrupter, i.e., when the interrupter is handling its normal load current or an acceptable overload current, the flux diverting coil is energised in the direction whereby the flux from the permanent magnet is diverted so that the magnetic pull exerted by the permanent magnet to hold the armature plate 16 in contact with the lower face 21 is released, whereupon the armature plate 16, the actuating rod 17 and the housing 23 fall under the influence of gravity and the compression springs 25 and 33. It will be appreciated that the contacts 11, 12 do not part immediately; the housing 23 moves relative to the element 24 until the disc portion 27 engages the upper end wall of the chamber 28 whereupon the element 24 moves with the housing 23 and the contacts 11, 12 open.

It will be appreciated that when the contacts 11, 12 are closed the current flowing through them also flows through the coil 36 to the terminal 39. It should be understood that the electro-magnetic force which is induced by the flow of current flowing through the coil 36 and which acts on the conductive plate 40 (FIG. 1), or the second coil 41 (FIG. 2), to force them away from the coil 36, is insignificant during normal operation of the interrupter and is withstood by the magnetic force holding the armature plate 16 in contact with the lower face 21. However, when a fault occurs in the circuit including the interrupter so that an excessive fault current arises, the electro-magnetic force increases rapidly and overcomes the magnetic pull holding the armature plate 16 in contact with the lower face 21 so that the conductive plate 40 (FIG. 1), or the second coil 41 (FIG. 2), is forced downwards carrying the actuating rod 17 with it and thus bringing about an opening of the contacts 11, 12. Since the magnetic pull exerted upon the armature plate 16 is generally inversely proportional to the square of the distance between the lower face 21 and the armature plate 16, its effect soon becomes negligible and the contact opening movement of the armature plate 16, the actuating rod 17 etc. continues under the influence of the spring 33, the momentum of the moving parts, gravity, and the electro-magnetic force between the coil 36 and the conductive plate 40, or the second coil 41.

The magnitude of the electro-magnetic force exerted on the conductive plate 40, (or the second coil 41), is mainly dependent upon the square of the instantaneous value of the current flowing through the coil 36, therefore, when a fault current arises, the electro-magnetic force produced exceeds the magnetic force holding the armature plate 16 in contact with the body part 19 before the peak fault current is reached. Furthermore, such a fault current tripping operation is initiated over a narrow range of instantaneous current values which is largely independent of the prospective peak amplitude. For example we have found by experiment that, with a $5/16$ inch thick x 4 inch diameter duralumin conductive plate 40 and a ten-turn coil 36, an electromagnetic force of 200 lbs. is produced at an instantaneous current value of 4 ka. in a 50 Hz. loop for peak amplitudes between 5 and 25 ka.

The operation of the modification described with reference to FIG. 3 is similar to that described above with reference to FIG. 2. As in the embodiment of FIG. 2, the electro-magnetic force induced during normal operation of the interrupter is not large enough to overcome the magnetic force holding the armature plate 16 in contact with the lower face 21; but, when a fault current arises, the electromagnetic force exceeds the magnetic force and the coil 43 is attracted towards the coil 36 forcing the armature plate 16 away from the lower face 21 and thus bringing about an opening operation of the contacts 11, 12 as before.

Although the vacuum circuit interrupter 10 has been described in the vertical position, the loading of the springs 25 and 33 may be selected so that the vacuum circuit interrupter may be operated in any other position. The effective magnetic force holding the armature plate 16 in contact with the body part 19 may be adjusted by altering the loading of the springs 25 and 33. The magnitude of the current at which the electro-magnetic force exceeds the magnetic force holding the armature plate 16 in contact with the body part 19 depends upon the number of turns of the coil 36 and the magnitude of the effective magnetic force and may be conveniently altered to suit requirements by altering the loading of the springs 25 and 33.

It should be understood that, although the magnetic actuator 15 described has a single permanent magnet and a flux diverting coil, an electro-magnet may be employed instead of, or in addition to, the permanent magnet, thus providing a no-volt release facility if required. Furthermore, the magnetic actuator may be double ended, having two armature plates and incorporating a permanent magnet or an electro-magnet as described in British Pat. No. 884,726.

Alternatively, any other suitable form of high speed actuator may be used instead of the magnetic actuator 15.

It will be appreciated that the actuating device 14 may be employed to actuate a circuit interrupter having contacts in air, oil or in any other medium commonly used in circuit interrupter practice.

A three-phase circuit interrupter may be provided with three actuating devices 14, each adapted to actuate a respective circuit interrupter of the three-phase unit; or alternatively each interrupter may be provided with two mutually inductively coupled elements arranged in accordance with this invention and may be connected to a common magnetic actuator 15 through a respective actuating rod 17.

We claim:
1. Electrical switchgear including fixed structure, a pair of relatively movable co-operating contacts, and actuating means having a movable part coupled to a movable one of said pair of relatively movable co-operating contacts for moving said one contact into and out of engagement with the other contact of said pair of relatively movable co-operating contacts, wherein the improvement comprises first and second relatively movable elements which are mutually inductively coupled when the contacts are closed, said first element being mounted on said movable part and said second element being mounted on said fixed structure, at least one of said elements comprising coil means electrically connected in series with one of said pair of relatively movable co-operating contacts, the arrangement being such that, during normal operation of the switchgear with the contacts closed, said actuating means urges said one contact to its engaged position against the electro-magnetic force normally exerted between the two elements, whereas, if the current flowing through said coil means exceeds a predetermined value, the electro-magnetic force overcomes the force applied by said actuating means whereby to move said movable part in the contact opening direction.

2. Electrical switchgear according to claim 1, wherein the improvement further comprises said second element comprising a said coil means which is rigidly mounted on said fixed structure.

3. Electrical switchgear according to claim 2, wherein the improvement further comprises said first element being positioned in close proximity to the rigidly mounted coil means when the contacts are closed so that the electro-magnetic force urges said first element away from said rigidly mounted coil means.

4. Electrical switchgear according to claim 3, wherein the improvement further comprises said first element comprising a conductive plate.

5. Electrical switchgear according to claim 3, wherein the improvement further comprises said first element comprising a coil having two ends which are connected together.

6. Electrical switchgear according to claim 2, wherein the improvement further comprises:
 (i) flexible connection means, and
 (ii) said first element comprising a said coil means which is electrically connected in series with the rigidly mounted coil means through said flexible connection means.

7. Electrical switchgear according to claim 6, wherein the improvement further comprises said first and second elements being spaced apart when the contacts are closed by a distance which is at least as great as the spacing between the contacts in their open position, and being electrically connected in series so that the electro-magnetic force urges said first element towards said second element.

8. Electrical switchgear according to claim 2, wherein the improvement further comprises flexible connection means whereby the rigidly mounted coil means is connected electrically in series with said movable contact.

9. Electrical switchgear according to claim 1, wherein the improvement further comprises said pair of relatively movable co-operating contacts being the contacts of a vacuum circuit interrupter.

10. Electrical switchgear according to claim 1, wherein the improvement further comprises said actuating means including a magnetic actuator having an armature plate, said armature plate being part of said movable part.

References Cited
UNITED STATES PATENTS

| | | | |
|---|---|---|---|
| 3,366,900 | 1/1968 | Barkan | 335—16 |
| 3,425,009 | 1/1969 | Voigt | 335—177 |

BERNARD A. GILHEANY, Primary Examiner

H. BROOME, Assistant Examiner

U.S. Cl. X.R.

335—177